(No Model.) 2 Sheets—Sheet 1.

H. A. HUGHES.
PROCESS OF EXTRACTING SUGAR FROM SORGHUM BY DIFFUSION.

No. 402,083. Patented Apr. 23, 1889.

WITNESSES.  
Gustave Dieterich  
Edgar Goodwin

INVENTOR,  
Henry A. Hughes  
BY  
his ATTORNEY.

(No Model.) 2 Sheets—Sheet 2.
H. A. HUGHES.
PROCESS OF EXTRACTING SUGAR FROM SORGHUM BY DIFFUSION.
No. 402,083. Patented Apr. 23, 1889.
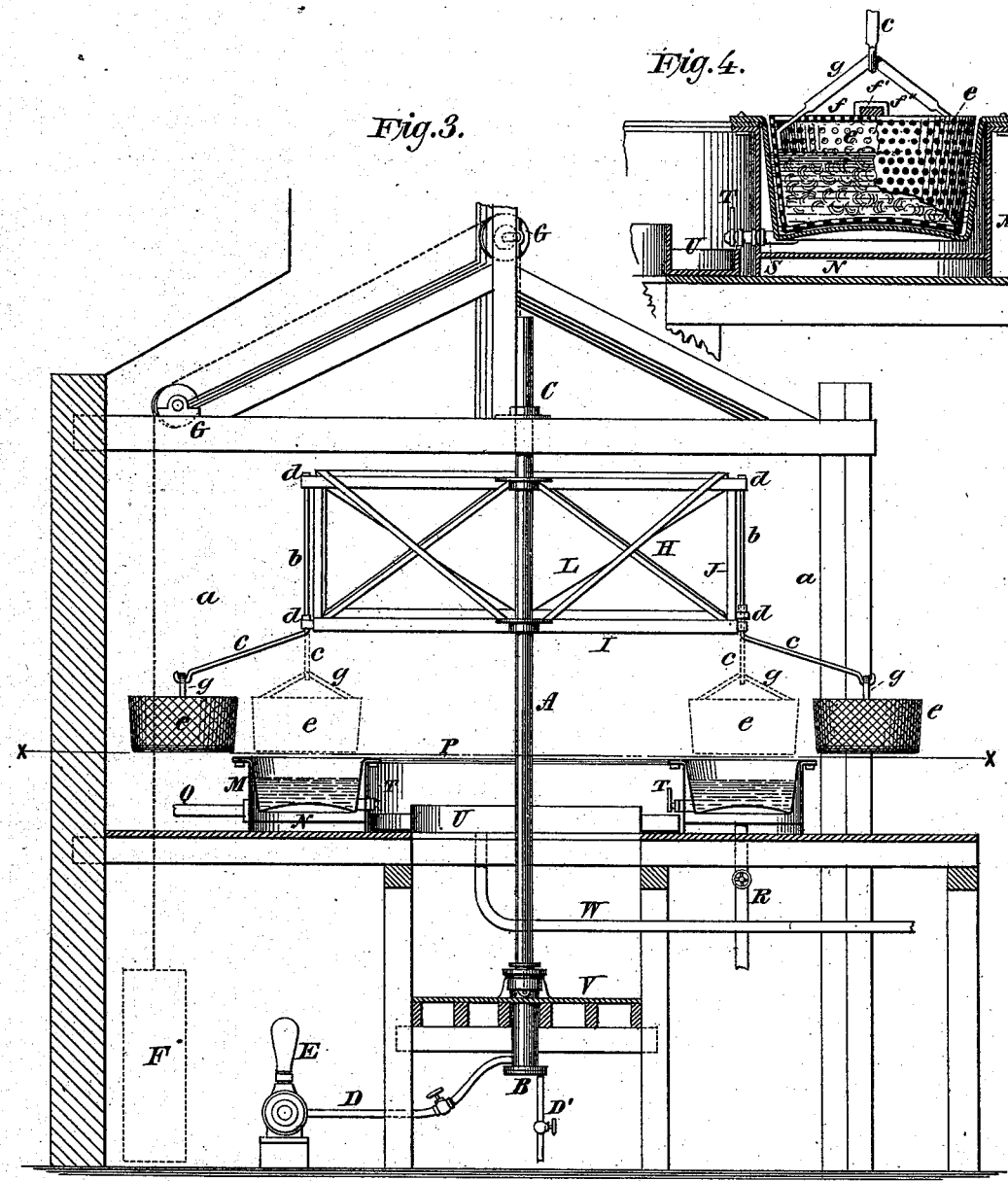
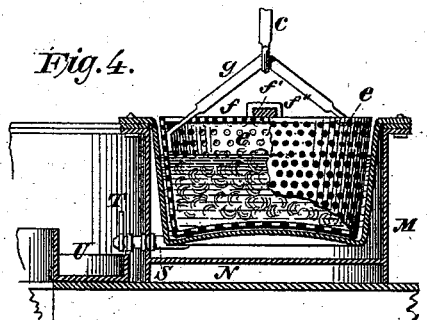
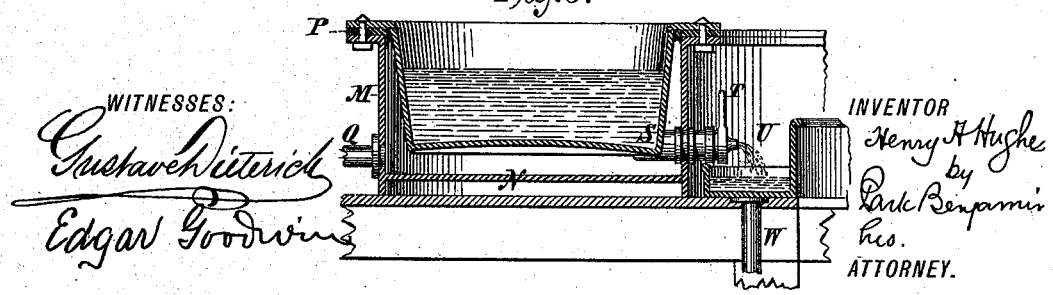

UNITED STATES PATENT OFFICE.

HENRY A. HUGHES, OF RIO GRANDE, NEW JERSEY.

PROCESS OF EXTRACTING SUGAR FROM SORGHUM BY DIFFUSION.

SPECIFICATION forming part of Letters Patent No. 402,083, dated April 23, 1889.

Application filed December 27, 1887. Serial No. 258,966. (No specimens.)

*To all whom it may concern:*

Be it known that I, HENRY A. HUGHES, of Rio Grande, Cape May county, New Jersey, have invented a new and useful Improvement in Processes of Extracting Sugar from Sorghum by Diffusion, of which the following is a specification.

My process depends upon the following principles: first, to render a given body of water constantly richer in sugar until a given density is reached by successively immersing in said body of water masses of cane in disintegrated or shredded forms; second, to remove the sugar from a given mass of disintegrated or shredded cane by immersing the same in successive bodies of water, each of which withdraws a portion of the sugar from the cane, and, third, to order and arrange the carrying of the foregoing principles into practice so as to make the operation a continuous one—that is, so that each vessel of the series in turn shall discharge its concentrated liquor and be refilled with fresh water, this in contradistinction to bringing the liquor in all the vessels to a given density, discharging all together, refilling all anew with fresh water, and beginning over again.

I will first describe my apparatus, which constitutes one practical means of carrying my process into effect to produce a useful and beneficial result.

Figure 1:
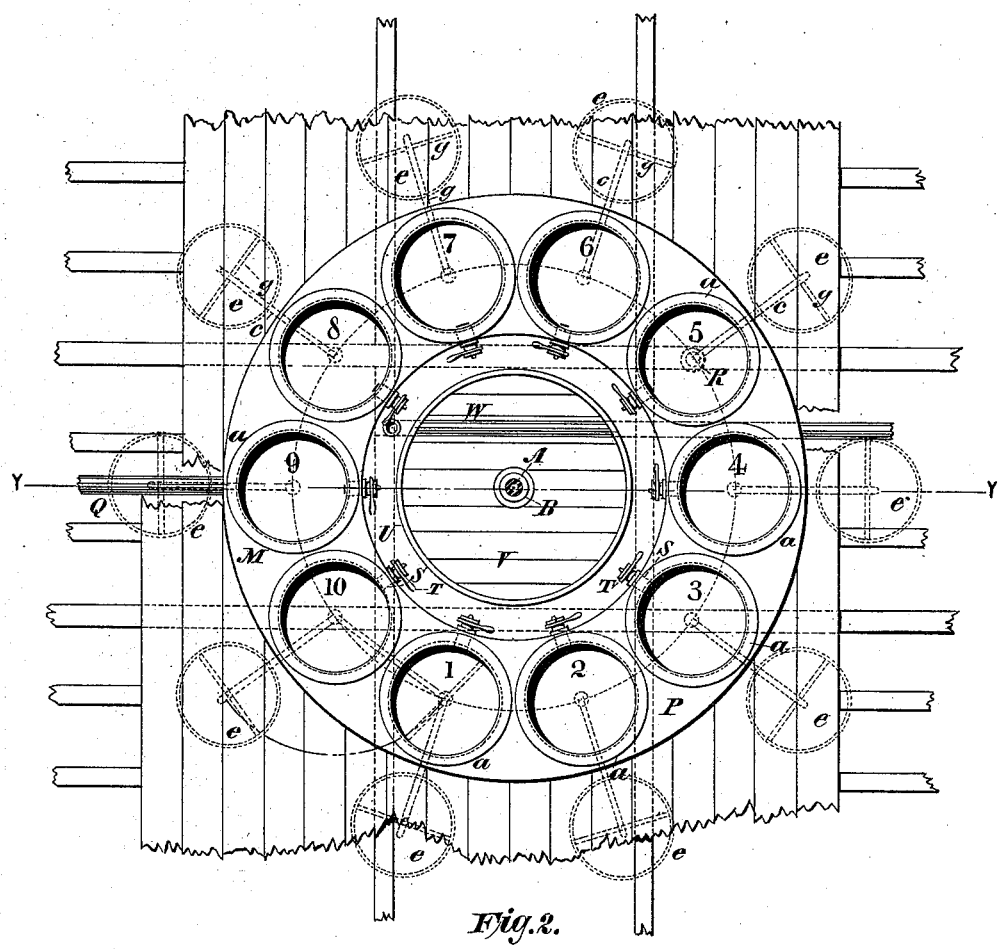
Figure 2:
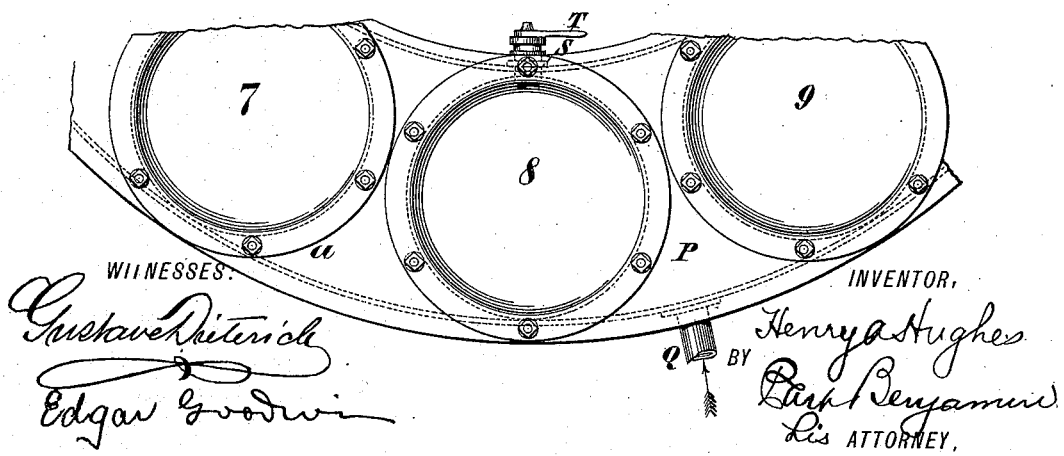

In the accompanying drawings, Figure 1 is a view showing the battery of diffusion-cells in plan view and other portions of the apparatus in horizontal section on the line $x\ x$ of Fig. 3. Fig. 2 is a plan view of portion of the diffusion-cells on a larger scale than the same are shown in Fig. 1. Fig. 3 is a vertical section of the apparatus on the line Y Y of Fig. 1. Fig. 4 is a vertical section in detail of one of the diffusion-cells and adjacent parts of the apparatus with a cane-basket in the cell. Fig. 5 is a vertical section of one of the diffusion-cells with the cane-basket removed, showing also the receiving-trough connections for the liquid after diffusion is completed.

Similar letters of reference indicate like parts.

A is a vertical shaft, which at its lower extremity may form or be secured to the plunger of the cylinder B. The upper portion of said shaft passes through a sleeve or bearing, C, in which bearing the shaft has free vertical motion. The shaft is also free to rotate on its own axis in bearing C and cylinder B. Communicating with cylinder B beneath the shaft is a pipe, D, conducting water from a pump, as E. When water is forced into cylinder B, the shaft is raised by hydraulic pressure, assisted by the counter-weight F, which is connected to the upper end of shaft A by a cord or chain passing over the fixed pulleys G. When water is allowed to escape from cylinder B, as by pipe D', after the shaft A has been elevated, as aforesaid, said shaft then descends by its own gravity.

Supported upon shaft A is a metal skeleton frame-work, H, consisting of radial members I, connected by vertical members J and horizontal circumferential members (not shown) at the extremities of said radial members, and by suitably-disposed diagonal members, L, the whole producing a light but strong polygonal or circular structure.

Upon the flooring directly beneath the circumference of the frame-work H is the diffusion-battery. This consists, first, of an annular tank, M. The bottom N, Fig. 5, of this tank is elevated, so that an air-space is left between said bottom and the floor. The top of the tank M is covered by an annular plate, P, in which are circular apertures to receive the diffusion-cells 1 to 10. The top edges of tank M are flanged, and the covering-plate P is riveted steam and water tight to said flanges. The upper edges of the cells 1 to 10 are also flanged, and are riveted steam and water tight to the plate P. The tank M therefore forms a jacket which incloses all the cells 1 to 10. Into this jacket steam or hot water may be admitted, in order to heat the contents of the cells, by the pipe Q, and conducted from said jacket by the pipe R. The position and arrangement of pipes Q and R are not material, so long as they properly provide for admission and escape of steam or hot water into and from the tank or jacket M.

The cells 1 to 10 are preferably made of sheet-copper and with convex bottoms to facilitate withdrawal of their contents. With each cell is connected a short pipe-section, S, which extends through the inner wall of tank or jacket M and has a stop-cock, T. The delivery-orifices of the several draw-off pipes S are disposed above an annular trough, U, which surrounds an opening in the floor upon which the diffusion-battery rests, through which opening the shaft A passes. The cylinder B is supported upon a platform, V, directly below this opening. A workman standing on the platform V may conveniently manipulate all the stop-cocks T, and so cause any cell at will to discharge its contents into the circular trough U. From trough U a pipe, W, conveys the sugar-liquor to an evaporator, (not here shown,) whence after evaporation the material is conducted to such other apparatus as may be requisite for the obtaining of the sugar in crystallized form.

Returning now to the frame-work H, upon the outer periphery of this structure are disposed as many swinging brackets or cranes $a$ as there are cells 1 to 10. Each bracket consists of a vertical pivot-arm, $b$, and an outwardly-inclined arm, $c$, and at the end of each arm $c$ a hook is provided. The pivot-arms $b$ are supported and turn freely in bearings $d$ upon the frame H. The distance between successive pivot-arms $b$ equals the distance between the centers of successive cells 1 to 10, and the horizontal distance from the end of arm $c$ to a point below pivot-arm $b$ also equals the distance between centers of successive cells; hence, for example, as shown on the left of Fig. 1 by dotted lines, the arm $c$, having its pivot-arm $b$ directly over the center of cell 10, may be swung inwardly, so as to bring whatever is carried on the hook at the end of arm $c$ directly over the adjacent cell 1, and so for all other arms $c$ and cells of the series.

At $e$, Fig. 4, is shown a receptacle for the cut cane, which I term herein a "cane-basket." It is made preferably of perforated sheet-copper, and is provided with a cover, $f$, of the same material, which may be secured in place by any suitable means, as by a bar, $f'$, entering loops $f''$ on the edges of the basket. A metal bail, $g$, serves to suspend the cane-basket from the hooks of arms $c$.

Having described the construction of my apparatus, I will now set forth my process of diffusion. The sorghum-stalks are cut up into short lengths, freed from leaves, sheaths, and seed-heads, and then shredded. These various operations may be accomplished in any suitable way; but I prefer to perform them by the agency of certain apparatus invented by myself. (Not here shown and not necessary here to describe.)

I begin by filling the cells 1 to 10 with water and heating the same to about 100° Fahrenheit or over by means of steam or hot water admitted into the tank or jacket M. A cane-basket, which for present convenience I will designate as "basket 1," is now filled with shredded cane. The shaft A being in its lowest position—that is, the water being out of cylinder B—the swinging bracket-arm $c$ over cell 2 (for example) is swung outward, and the basket 1 is suspended by its bail from the hook on said arm. Water is now pumped into cylinder B and shaft A is elevated sufficiently to allow the bottom of the suspended basket to clear the top of the tank M. Then the arm $c$ is swung inward, so as to bring basket 1 directly over cell 1, (dotted lines, Fig. 3.) Water is now allowed to escape from cylinder B, the shaft A descends, and basket 1 is thus deposited in the water in cell 1. The hot water then acts upon the shredded cane to dissolve out a portion of the contained sugar. Another basket (which I will call "basket 2") is now filled with shredded cane and brought to the battery. During the filling of this second basket, or during any predetermined period of time, basket 1 is allowed to remain in cell 1. When basket 2 is ready, or when the predetermined interval of time has elapsed, basket 2 is attached to the bracket-arm which has its pivot $b$ above cell 1—that is, to the arm which, if all parts remained in their present position, and assuming the operation already described repeated, would result in placing basket 2 in cell 10; but this is not done. Basket 2 being attached to the arm above mentioned, shaft A is elevated, and of course basket 1 is lifted out of cell 1. Now shaft A is rotated on its own axis in the direction of the large arrow, Fig. 1, so as to bring basket 1 over cell 2 next in succession on the right, and basket 2 over cell 1, when its supporting-arm is swung inward. Shaft A is then lowered with this result, namely: Basket 2, containing fresh cane, has been placed in cell 1, the water of which has already taken sugar from the contents of basket 1. Basket 1 has been shifted into fresh water in cell 2, which acts upon the now partially-spent cane therein. The same predetermined interval of time is now allowed to elapse and a third filled basket (basket No. 3) is prepared. This is hooked upon the bracket which has its pivot over cell 9, and which would (if the shaft A were not again rotated) land this basket in cell 10; but the shaft is again raised and again rotated. The consequence is that basket 1, which has now been in cells 1 and 2, is placed in cell 3. Basket 2 in cell 1 is placed in cell 2 and basket 3, containing fresh cane, is placed in cell 1. Other baskets are successively got ready and the same operation repeated until finally every cell has a basket in it. This naturally will come to pass when basket 1 has been successively in each and all of the cells and when ten baskets have successively been immersed in cell 1. Basket 1 will therefore have been subjected to ten washings, each washing in turn being with fresh water and each body of water extracting a portion of the sugar which remains in the cane after the preceding washing. On the other hand, ten baskets have in turn been immersed in cell 1. From the cane in each basket successively the water in cell 1 has dissolved sugar. Consequently the density of the sugar-liquor in cell 1 becomes greater and greater with each successive basket, and finally, after the tenth basket has been received, the liquor in cell 1 may be dense enough or sufficiently charged with sugar to be ready for evaporation. This being the case, the stop-cock T in the tube S, connecting with cell 1, is opened, and the contents of that cell are allowed to escape into trough U, and so to the evaporator, or wherever else desired. Cell 1 is then cleansed from sediment and refilled with fresh water, and the contents of basket 1, now exhausted, are thrown out and fresh cane put in. The refilled basket is, however, not placed in the fresh water of cell 1, but in the liquor of cell 2, because, although cell 1 before emptying had received ten baskets in turn, cell 2 obviously had received but nine. Consequently the tenth immersion in cell 2 is made with the eleventh basket.

While the operation above described is a continuous one in the sense already explained, each vessel in the series being discharged in turn and each in turn refilled with fresh water, it should be understood that I do not limit my invention to such a continuous process. It is quite practicable, for example, to fill ten baskets with cane and place all at once in the ten cells. Then, after a given time, the baskets may be raised from the cells and the shaft A rotated, so as to allow basket 1 to be placed in cell 2, basket 2 in cell 3, and so on around the circle, and this may be repeated until each basket has been in each cell. Then, assuming all the contents in all the cells thus to be brought at the same time to the desired density, all stop-cocks may be opened, so draining all the cells at once. This mode of operation is, however, less preferable in point of economy and expedition to the continuous process already described.

In another application for Letters Patent filed simultaneously herewith, Serial No. 258,967, I have fully described the construction of the apparatus herein set forth. Consequently the subject-matter of the said application is herein disclaimed.

I claim—

1. The continuous process of diffusion, substantially as herein described, which consists in subjecting successive masses of cane in a disintegrated or shredded condition to the action of stationary bodies of hot water contained in a series of successive independent non-communicating vessels, by immersing each mass of cane successively in each vessel, and thereby bringing the liquor in each vessel to a predetermined density.

2. The continuous process of diffusion, substantially as herein described, which consists in, first, charging a given number of vessels not communicating with one another with hot water; second, immersing in vessel No. 1 a mass of cane, No. 1, in disintegrated or shredded condition; third, removing said mass No. 1 to vessel No. 2, and placing in vessel No. 1 a new mass, No. 2, of shredded cane; fourth, removing masses Nos. 1 and 2, respectively, from vessels 1 and 2 to vessels 2 and 3, and placing a new mass of cane, No. 3, in vessel No. 1, and so continuing immersing successive masses of cane in each vessel until the liquor in each vessel shall attain a predetermined density.

HENRY A. HUGHES.

Witnesses:
   D. H. DRISCOLL,
   EDGAR GOODWIN.